(12) United States Patent
Diamond

(10) Patent No.: US 11,598,399 B2
(45) Date of Patent: Mar. 7, 2023

(54) INDEXED DRIVE SYSTEM

(71) Applicant: GlaxoSmithKline Consumer Healthcare (UK) IP Limited, Middlesex (GB)

(72) Inventor: David Diamond, Cascais (PT)

(73) Assignee: GlaxoSmithKline Consumer Healthcare (UK) IP Limited, Middlesex (GB)

( * ) Notice: Subject to any disclaimer, the term of this patent is extended or adjusted under 35 U.S.C. 154(b) by 942 days.

(21) Appl. No.: 16/346,230

(22) PCT Filed: Oct. 30, 2017

(86) PCT No.: PCT/EP2017/077711
§ 371 (c)(1),
(2) Date: Apr. 30, 2019

(87) PCT Pub. No.: WO2018/083048
PCT Pub. Date: May 11, 2018

(65) Prior Publication Data
US 2020/0056684 A1    Feb. 20, 2020

(30) Foreign Application Priority Data

Nov. 1, 2016    (IE) ..................................... 2016/0252

(51) Int. Cl.
| | |
|---|---|
| *F16H 25/00* | (2006.01) |
| *F16H 25/12* | (2006.01) |
| *A46B 13/02* | (2006.01) |
| *A61C 17/34* | (2006.01) |

(52) U.S. Cl.
CPC ........... *F16H 25/125* (2013.01); *A46B 13/02* (2013.01); *A61C 17/3472* (2013.01); *F16H 25/12* (2013.01); *A46B 2200/1066* (2013.01); *A61C 17/3418* (2013.01); *A61C 17/3463* (2013.01)

(58) Field of Classification Search
CPC ....... F16H 25/125; F16H 25/12; A46B 13/02; A46B 2200/1066; A61C 17/3472; A61C 17/3418; A61C 17/3463; A61C 17/26; A61C 1/18; A61C 17/22; A61C 17/221; A61C 17/34; F16D 11/14
See application file for complete search history.

(56) References Cited

U.S. PATENT DOCUMENTS

| | | | |
|---|---|---|---|
| 2,062,195 A | 11/1936 | Smith | |
| 2010/0132140 A1* | 6/2010 | Diamond | ............. A61C 17/349 15/22.1 |

FOREIGN PATENT DOCUMENTS

| | | |
|---|---|---|
| DE | 10 2014 201250 A1 | 7/2015 |
| EP | 2 142 138 A2 | 1/2010 |
| WO | WO 93/09729 A1 | 5/1993 |

* cited by examiner

*Primary Examiner* — Victor L MacArthur
(74) *Attorney, Agent, or Firm* — Roshni A. Sitapara

(57) ABSTRACT

An indexed drive system (10) for mechanised tools, in particular an electric toothbrush, for selectively imparting various drive modes to a pair of concentrically-arranged drive shafts (12, 14) thereby imparting various brushing modes to the head (H) of the mechanised tool, in particular an electric toothbrush.

13 Claims, 4 Drawing Sheets

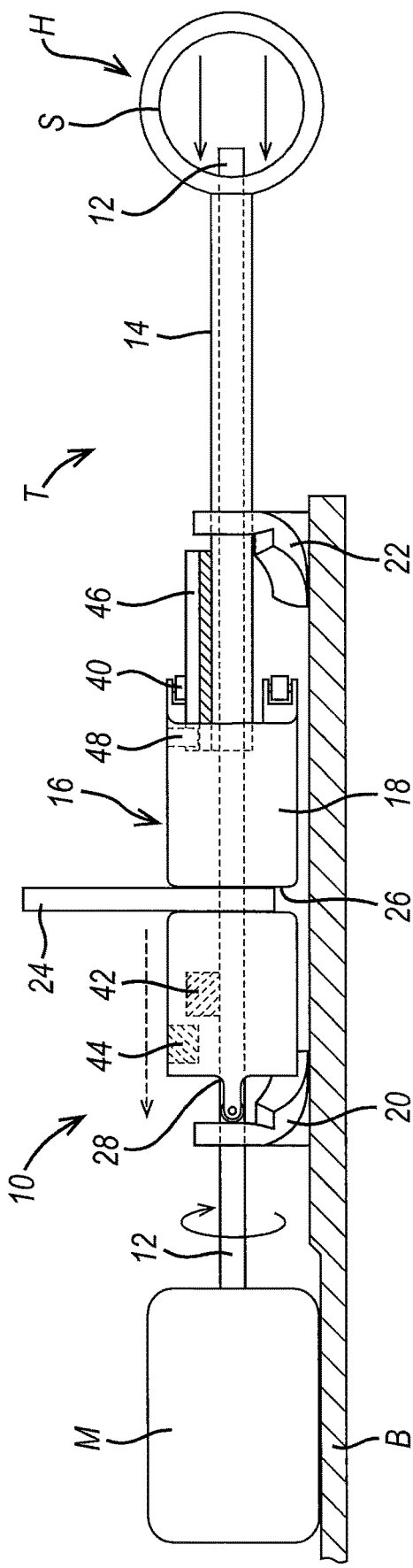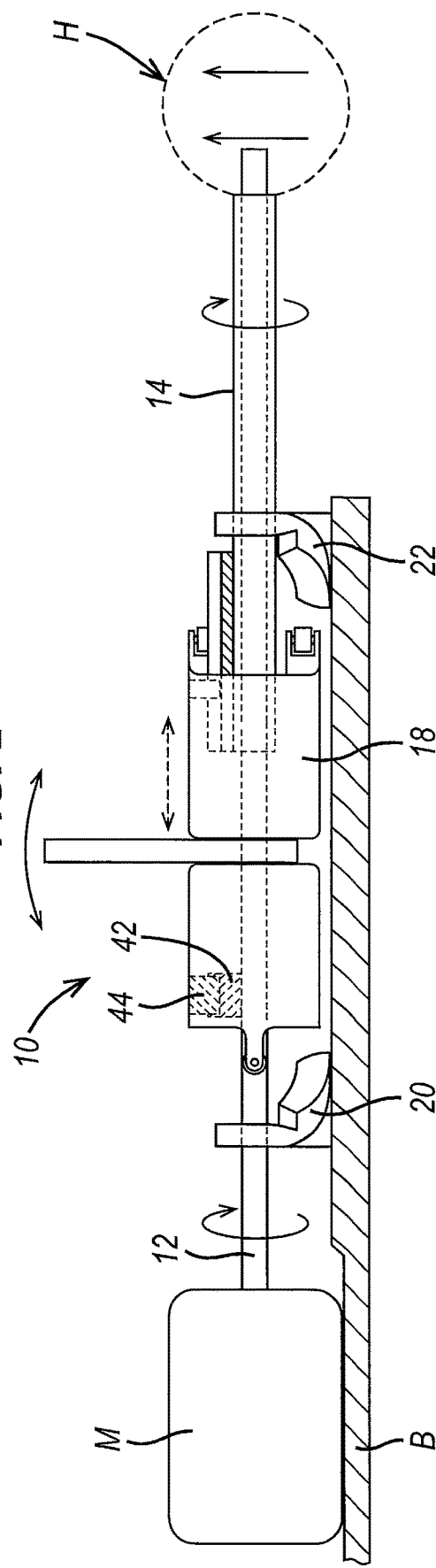

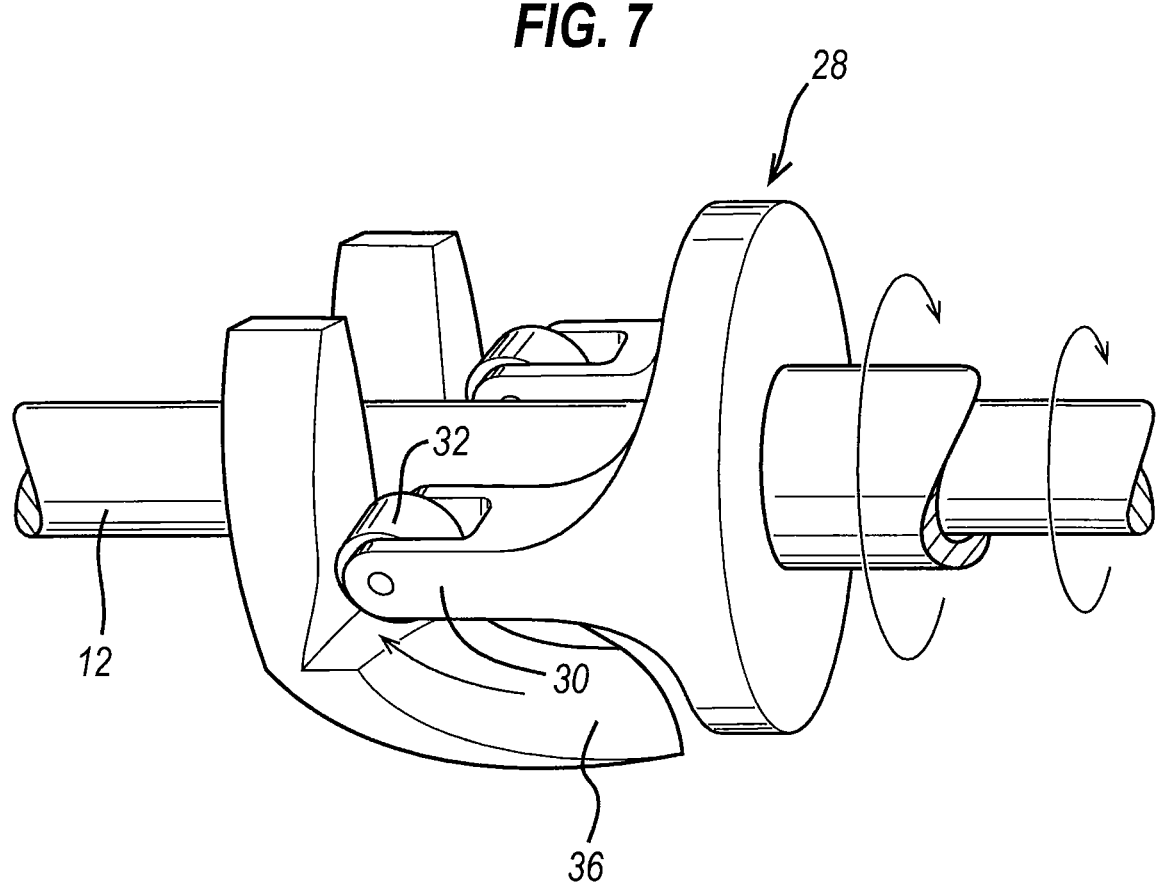

INDEXED DRIVE SYSTEM

This application is a 371 of International Application No. PCT/EP2017/077711, filed Oct. 30, 2017, which claims the priority of IE Application No. IE S2016/0252 filed Nov. 1, 2016, which is incorporated herein in its entirety.

FIELD OF THE INVENTION

This invention relates to an indexed drive system for selectively imparting various drive modes to a pair of concentrically arranged drive shafts, for example as may be used in an electric toothbrush or the like in order to impart various brushing motions to a head of the toothbrush.

BACKGROUND OF THE INVENTION

Electric or otherwise powered mechanised tools for various applications are well known in the art. In particular with reference to electric brushes such as but not exclusively electric toothbrushes, the majority of conventional electric toothbrushes apply a brushing action by means of a mechanical drive in order to brush teeth, tongue, gums and any other parts of the mouth, thereby reducing the manual force required to clean the teeth while also providing brushing motions which may not be conveniently replicated manually. In addition known toothbrushes provide dual, multi directional or scatter brushing motion, and the use of one or more shafts used to drive the head of the brush in these various defined brushing motions is known. The direction of the brushing motion produced by mechanised toothbrushes is however generally the same irrespective of the part of the mouth or teeth with which they are in contact. However this single non variable motion is not generally effective or efficient in cleaning every part of the teeth, gums and tongue.

The Applicants earlier European Patent EP2142138 discloses an improved electric toothbrush which incorporates a substantially spherical brush head having two substantially hemispherical sections separated from one another, in addition to electric drive means in the form of a motor and drive means which extends upwardly through the channel and which is adapted to impart first and second independent brushing motions to the head, in particular a first motion in which the head spins about a first axis which passes through the centre of the head, and a second motion in which the brush head spins about a second axis substantially perpendicular to the first axis. In this way multiple improved brushing motions may be achieved, and which may be selected depending on the part of the mouth being cleaned.

It is an object of the present invention to provide an improved drive system for such mechanised tools, and in particular for an electric toothbrush, which is capable of more accurately controlling the application of drive from a motor to a driven component such as a head of the mechanised tool.

SUMMARY OF THE INVENTION

According to the present invention there is provided a drive system comprising concentric inner and outer rotatable shafts, the inner shaft extending beyond the outer shaft; an indexing assembly comprising a carriage located about the extended portion of the inner shaft and reciprocally displaceable longitudinally of the inner shaft, and at least a first converter for translating linear displacement of the carriage into limited angular displacement of the carriage; a first coupling selectively operable to transmit drive from the inner shaft to the carriage; and a second coupling selectively operable to transmit drive from the carriage to the second shaft.

Preferably, the at least first converter comprises a cam and follower.

Preferably, the cam is fixed relative to the shafts and the follower is provided on the carriage.

Preferably, the cam defines a helical cam surface concentric with the shafts.

Preferably, the follower extends longitudinally from an end of the carriage.

Preferably, the follower comprises a pair of diametrically opposed follower elements.

Preferably, the indexing mechanism comprises a pair of the converters for translating linear displacement of the carriage in one direction into a first limited angular displacement of the carriage and linear displacement of the carriage in a second direction opposite to the first direction into a limited second angular displacement of the carriage.

Preferably, one of the converters extends longitudinally from each of the opposed ends of the carriage.

Preferably, the drive system comprises an actuator operable to effect the linear displacement of the carriage.

Preferably, the actuator comprises a forked yoke received in a annular channel circumscribing the carriage.

Preferably, the first coupling is selectively operable in response to linear displacement of the carriage.

Preferably, the first coupling comprises a 1st tab on the inner shaft and a corresponding $2^{nd}$ tab on the carriage.

Preferably, the second coupling is selectively operable in response to linear displacement of the carriage.

Preferably, the second coupling comprises a key and keyway provided between the carriage and the outer shaft.

BRIEF DESCRIPTION OF THE DRAWINGS

The present invention will now be described with reference to the accompanying drawings, in which:

FIG. 1 illustrates a schematic side elevation of an electric toothbrush incorporating a drive system according to an embodiment of the present invention, in a first mode of operation;

FIG. 2 illustrates the electric toothbrush shown in FIG. 1 with the drive system in a second mode of operation;

FIG. 7 illustrates the indexing assembly of FIGS. 5 and 6 in an engaged position.

DETAILED DESCRIPTION OF THE DRAWINGS

Figure 3:
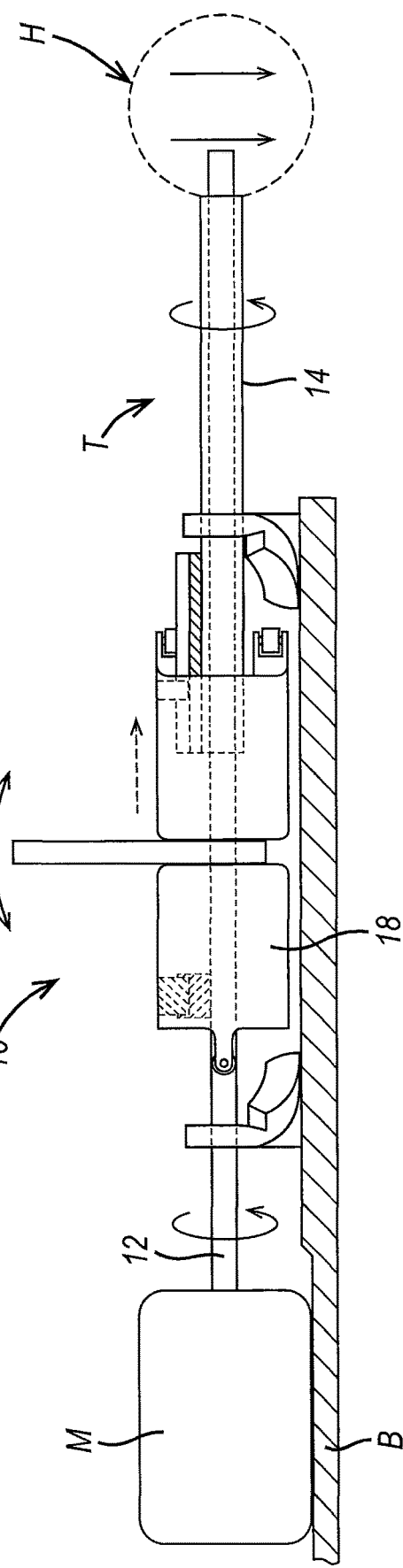
FIG. 3 illustrates the electric toothbrush of FIG. 1 with the drive system in a third mode of operation.

Referring now to the accompanying drawings there is illustrated a drive system 10 which is shown incorporated into an electric toothbrush T, although it will be appreciated from the following description that the drive system 10 could be utilised in other mechanised tools in which various drive modes are imparted from a pair of concentric drive shafts which may be rotated synchronously or independently as described hereinafter.

In the embodiment illustrated the drive system 10 will be fully housed internally of a housing or body B of the electric toothbrush T, a small portion of which is illustrated. It will be appreciated that the body B will fully enclose the workings of the drive system 10 as described. In addition, again as with most conventional electric toothbrushes, it is envisaged that the body B would function as a handle for the toothbrush T, a head H projecting from one end of the body B, and in the accompanying drawings that is to the right of the body B in FIGS. 1 to 4. The body B may extend further to the left than is illustrated, for example in order to house one or more batteries (not shown) and control circulatory or the like for the toothbrush T. An electric motor M is illustrated and which in use is operable to transmit drive to the head H as hereinafter described.

The drive system 10 thus comprises a pair of concentric drive shafts, an inner shaft 12 which is directly driven by the motor M, and a concentric outer shaft 14 which effectively forms a sleeve about the inner shaft 12. The outer shaft 14 does not cover the entire length of the inner shaft 12, a section of which is uncovered from the motor M. The inner shaft 12 and outer shaft 14 are overlapped from a position distal the motor M to the head H, a ring shaped support S of the head H being formed integrally with the outer shaft 14 and will therefore rotate with the outer shaft 14 as hereinafter described. The inner shaft 12 preferably extends a short distance beyond the outer shaft 14 such as to project into the interior of the ring shaped support S where, for example, a bevel gear (not shown) or the like may be fitted to the free end of the inner shaft 12 in order to transmit drive from the motor M, via the inner shaft 12, to the head H.

In one mode of operation the outer shaft 14 is immobilised relative to the inner shaft 12, while the inner shaft 12 is driven by the motor M in order to effect rotation of two hemispherical sections (not shown) of the head H about an axis extending substantially perpendicular to a longitudinal axis of the inner shaft 12. In this mode of operation the outer shaft 14 and thus the support S remains stationary while the two hemispherical sections of the head H rotate thereon, the support S essentially forming a bushing on which the two hemispherical sections rotate. In a second mode of operation the inner shaft 12 and the outer shaft 14 are driven synchronously with one another and in this mode the pair of hemispherical sections of the head H remain stationary relative to the support S, but as the outer shaft 14 is also rotating the support S rotates and thus effects rotation of the head H about an axis which is coaxial with a longitudinal axis of the inner shaft 12. In both cases the direction of rotation of the head H may be reversed as will be described hereinafter, which thus allows the direction of rotation of the head H to be selected to suit the particular location in the mouth being brushed, or for example allowing the direction of rotation to be reversed from one side of the mouth to the other as the orientation of the toothbrush is reversed.

In the first mode of operation the support S is immobilised and only the inner shaft 12 is rotated. However it is preferable that the outer shaft 14 is immobilised with the support S held in a particular orientation such that the axis of rotation of the head H in this mode of operation assumes a preferred orientation in order to most effectively perform the brushing operation, for example brushing off the gum in a vertically downward direction. It is therefore a requirement of the drive system 10 to be capable of ensuring that the outer shaft 14 is located in this predetermined orientation when the mode of operation is switched from the second back to the first mode of operation, otherwise known as "indexing" the position of the outer shaft 14 and support S.

The drive system 10 is therefore operable to effect the above mentioned indexing and comprises an indexing assembly 16 which is operable as hereinafter described to effect indexing of the outer shaft 14 into at least one predefined orientation, in addition to effecting the transmission of drive from the inner shaft 12 to the outer shaft 14 to effect the second mode of operation wherein the inner shaft 12 and outer shaft 14 are rotated synchronously. The indexing assembly 16 comprises a carriage 18 which in the embodiment illustrated is of hollow cylindrical form and is mounted concentrically about the exposed portion of the inner shaft 12 and is both rotatable independently or synchronously with the inner shaft 12 while also being displaceable longitudinally on the inner shaft 12 between a first guide 20 and a second guide 22 which form part of the indexing assembly 16. In the embodiment illustrated the first and second guides 20, 22 are fixed to the body B of the toothbrush T and act as supports for the inner and outer shafts 12, 14 which pass through the first and second guides 20, 22 respectively. Thus the cylindrical carriage 18 is captured between these first and second guides 20, 22 and may be displaced longitudinally along the inner shaft 12 in order to independently contact the first and second guides 20, 22. Any suitable means may be provided in order to effect this longitudinal displacement of the carriage 18, and in the embodiment illustrated a forked lever 24 is engaged about an annular channel 26 formed in an exterior of the carriage 18, the lever 24 projecting, in use, through the body B to be accessible by a user of the toothbrush T, who can manually push the lever 24 towards or away from the head H in order to effect linear displacement of the carriage 18 captured within the body B.

Figure 5:
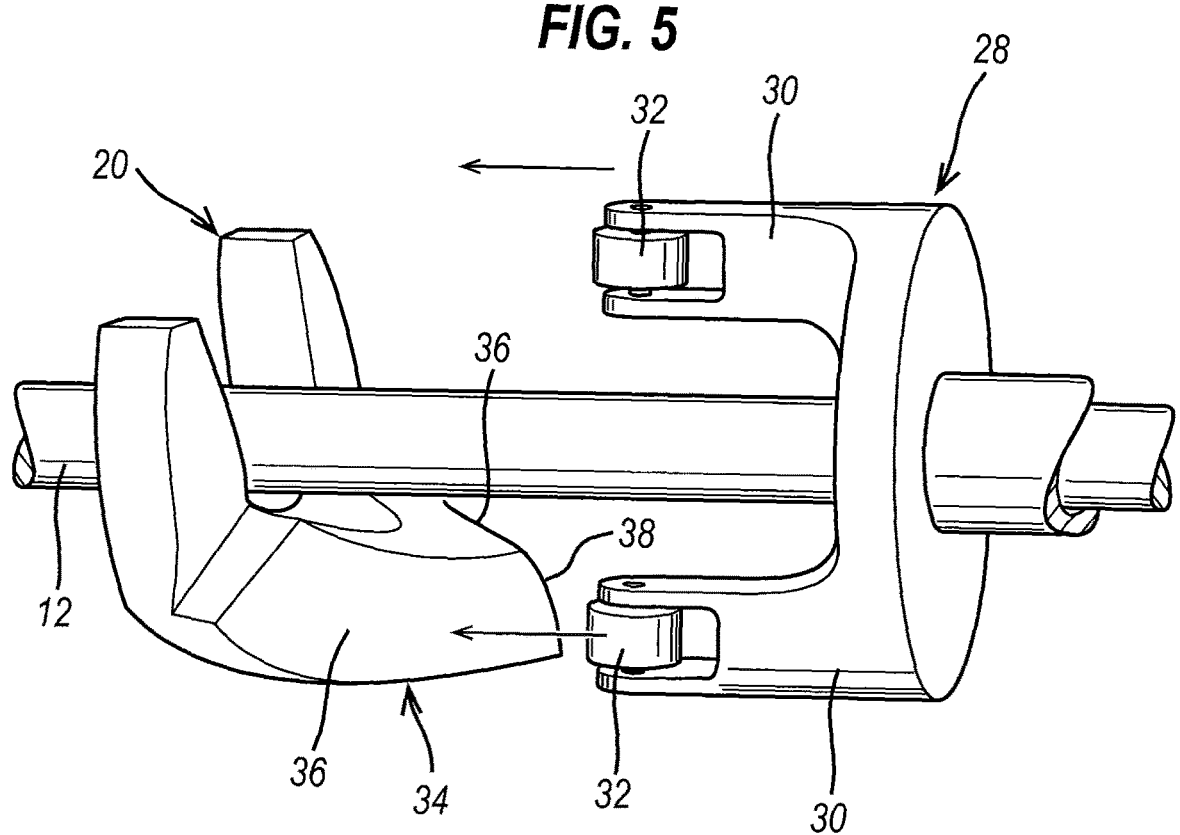
FIG. 5 illustrates an enlarged view of a portion of the drive system shown in FIGS. 1-4, in which an indexing assembly is in a disengaged position.
Figure 6:
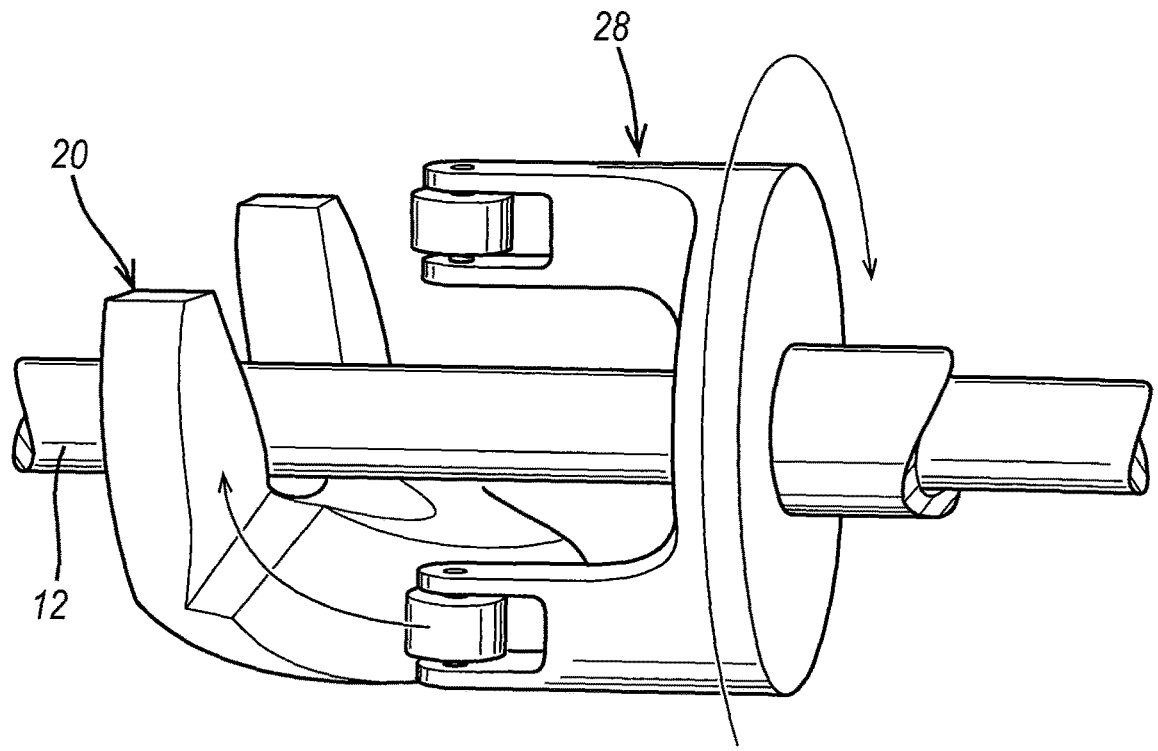
FIG. 6 illustrates the arrangement of FIG. 5 with the indexing assembly in a partially engaged position.

Referring in particular to FIGS. 5 to 7, the indexing assembly 16 further comprises a first converter for translating linear displacement of the carriage 18 into limited angular displacement of the carriage 18, the first converter comprising the first guide 20 and a first follower 28 formed at the free end of the carriage 18 adjacent the first guide 20. In FIGS. 5 to 7 the first follower 28 is illustrated in isolation from the remainder of the carriage 18 for the sake of clarity. The first follower 28 comprises a pair of diametrically opposed follower elements 30 each incorporating a freely rotatable wheel 32 at the free end thereof. The wheel 32 could be omitted from the follower element 30 or could be replaced with any other functional alternative, for example a freely moving ball housed in a socket in the free end of the follower element 30. The first guide 20 comprises a first cam 34 comprising a mirrored pair of opposed and diverging cam surfaces 36 which each define a helical path progressing from a substantially vertical orientation at an apex 38 of the cam 34, to a substantially horizontal orientation distal the apex 38.

It will therefore be appreciated that regardless of the angular orientation of the carriage 18, linear displacement thereof towards the first guide 20 will result in one or other of the follower elements 30 contacting one of the cam surfaces 36. Further linear displacement of the carriage 18 towards the first guide 20 will begin to effect the angular displacement of the carriage 18 as the wheel 32 of the follower element 30 rolls along the helical cam surface 36 toward the horizontal end of the cam surface 36. At this point the two follower elements 30 will be engaged against the horizontal portion of the two cam surfaces 36, and this will serve to prevent the carriage 18 from undergoing rotation while simultaneously ensuring that the carriage 18 is at a predefined angular orientation, hereinafter referred to as a first indexed position. In this position the inner shaft 12 is still capable of freely rotating within the carriage 18. It will thus be appreciated that the linear displacement of the carriage 18 against the first guide 20 effects simultaneous rotational displacement of the carriage 18, but that this rotational displacement is limited to turning the carriage until the follower elements 30 are in the horizontal orientation.

Figure 4:
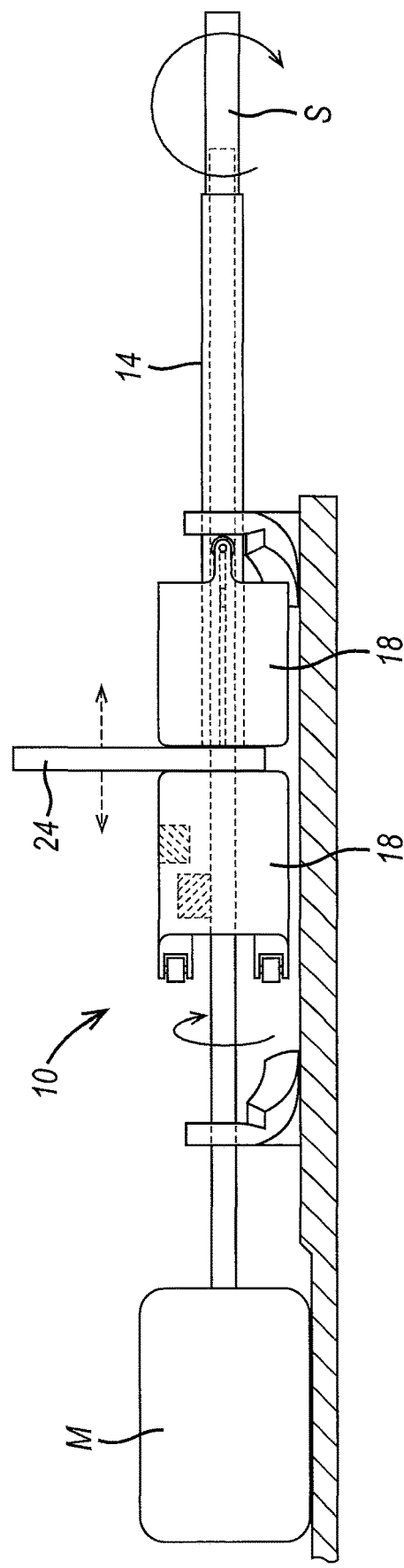
FIG. 4 illustrates the electric toothbrush of FIG. 1 with the drive system in a fourth mode of operation.

In similar fashion the carriage 18 may be displaced linearly towards and into contact with the second guide 22, the carriage 18 comprising a second follower 40 again comprising a pair of follower elements 30 each being preferably provided with a freely rotatable wheel 32 at the free end thereof. The second follower 40 is however 90 degrees out of phase with the orientation of the first follower 28 such as to enable the carriage 18, when engaged against the second guide 22, to be indexed into a second orientation 90 degrees out of phase with the first orientation, in order to provide a second indexed orientation. These first and second indexed orientations are illustrated in FIGS. 1 and 4 respectively. It can be seen that in the first indexed orientation the support S is located in a substantially vertical orientation while in the second indexed orientation the support S is located in a substantially horizontal orientation, or in other words at 90 degrees to one another.

In order to allow drive to be selectively transmitted from the inner shaft 12 to the carriage 18 the drive system 10 comprises a first coupling comprising a first tab 42 projecting radially outwardly from the inner shaft 12 at a position internal to the carriage 18, and a corresponding second tab 44 projecting radially inwardly from an inner wall of the carriage 18. The first tab 42 overlaps the second tab 44 other than when the carriage 18 is indexed against the first guide 20 or the second guide 22. Thus referring to FIGS. 1-4 the first and second tabs 42, 44 do not overlap in FIGS. 1 and 4, but do overlap in FIGS. 2 and 3. In FIG. 2 the inner shaft 12 is being driven in a first direction and in FIG. 3 in an opposed direction. The first and second tabs 42, 44 overlap such that drive is then transmitted from the inner shaft 12 to the carriage 18 which will therefore be driven synchronously. In order to transmit this drive from the carriage 18 to the outer shaft 14 the outer shaft 14 is dimensioned to extend into the interior of the carriage 18 and thus overlap therewith in all of the linear positions of the carriage 18. The drive system 10 comprises a second coupling operable to rotationally couple the carriage 18 and the outer shaft 14, regardless of the linear position of the carriage 18. The second coupling comprises a key way 46 formed longitudinally in the outer shaft 14 and a corresponding key 48 fixed to the interior of the carriage 18 and slidingly received in the key way 46.

Thus as the carriage 18 is displaced linearly between the first and second guides 20, 22 the key way 46 and key 48 will remain engaged and thus the angular orientation of the outer shaft 14 will be synchronised with the angular orientation of the carriage 18. It will therefore be appreciated that as a result by indexing the angular position of the carriage 18 the angular orientation of the outer shaft 14 and the integrated support S can therefore be effected, as illustrated in FIGS. 1 and 4. In these positions the first and second tabs 42, 44 are disengaged and thus drive is not transmitted from the inner shaft 12, via the carriage 18, to the outer shaft 14. As a result the support S will be indexed into either the first or second indexed position and will be held in this position while only the inner shaft 12 is driven in order to affect a first driving mode or brushing mode of the head H of the toothbrush T.

If the carriage 18 is then displaced out of register with either the first or second guide 20, 22 the first and second tabs 42, 44 will be engaged and thus effect the transmission of drive from the inner shaft 12 to the carriage 18, and via the keyway 46 and key 48 to the outer shaft 14. Thus both the inner shaft 12 and the outer shaft 14 will be driven synchronously with one another in either a first direction as illustrated in FIG. 2 or by reversing the motor M to be driven in a second opposite direction as illustrated in FIG. 3. This reversal of the direction of the motor M may be effected by any suitable means, whether through manual switching by the user or for example through one or more sensors (not shown) forming part of the drive system 10 or the toothbrush T and which may be operable to detect the orientation of the toothbrush T and to effect the automated switching of the direction of the motor M. Then when manual or automatic switching back to the first mode of operation occurs, for example by linearly displacing the carriage 18 against the second guide 22, the carriage 18 and thus the support S will be indexed into the second indexed position, while simultaneously the first and second tabs 42, 44 are disengaged such that drive is no longer transmitted through the carriage 18 to the outer shaft 14. The outer shaft 14 will thus again be rendered stationary and in a predetermined or indexed orientation while the inner shaft 12 rotates independently in order to transmit drive to the head H.

It will therefore be appreciated that the drive system 10 of the present invention provides a means of effecting indexing into at least a first indexed position, and preferably a pair of indexed positions, of a pair of concentric shafts which may be driven synchronously or independently.

The invention is not limited to the embodiment described herein but can be amended or modified without departing from the scope of the present invention.

The invention claimed is:

1. A drive system for an electric toothbrush comprising concentric inner and outer rotatable shafts, the inner shaft extending beyond the outer shaft; an indexing assembly comprising a carriage located about the inner shaft and reciprocally displaceable longitudinally of the inner shaft; and a first coupling selectively operable to transmit drive from the inner shaft to the carriage, wherein the drive system further comprises a pair of converters for translating linear displacement of the carriage in one direction into a first limited angular displacement of the carriage and linear displacement of the carriage in a second direction opposite to a first direction into a limited second angular displacement of the carriage.

2. A drive system according to claim 1 wherein at least a first converter of the pair of converters comprises a cam and follower.

3. A drive system according to claim 2 wherein the cam is fixed relative to the shafts and the follower is provided on the carriage.

4. A drive system according to claim 2 wherein the cam defines a helical cam surface concentric with the shafts.

5. A drive system according to claim 2 wherein the follower extends longitudinally from an end of the carriage.

6. A drive system according to claim 2 wherein the follower comprises a pair of diametrically opposed follower elements.

7. A drive system according to claim 1 wherein one of the converters extends longitudinally from each of the opposed ends of the carriage.

8. A drive system according to claim 1 wherein the drive system comprises an actuator operable to effect the linear displacement of the carriage.

9. A drive system according to claim 8 wherein the actuator comprises a forked yoke received in an annular channel circumscribing the carriage.

10. A drive system according to claim 1 wherein the first coupling is selectively operable in response to linear displacement of the carriage.

11. A drive system according to claim 10 wherein the first coupling comprises a 1st tab on the inner shaft and a corresponding 2.sup.nd tab on the carriage.

12. A drive system according to claim 1 wherein a second coupling is provided to transmit drive from the carriage to the second shaft which comprises a key and keyway provided between the carriage and the outer shaft.

13. An electric toothbrush comprising a drive system according to claim 1.

* * * * *